June 6, 1933.   J. DONALDSON   1,912,518
TRACTOR
Filed Jan. 21, 1931   3 Sheets-Sheet 1

INVENTOR
JOHN DONALDSON

June 6, 1933. J. DONALDSON 1,912,518
TRACTOR
Filed Jan. 21, 1931 3 Sheets-Sheet 2

INVENTOR
JOHN DONALDSON
BY [signature] ATTY.

June 6, 1933.   J. DONALDSON   1,912,518
TRACTOR
Filed Jan. 21, 1931   3 Sheets-Sheet 3
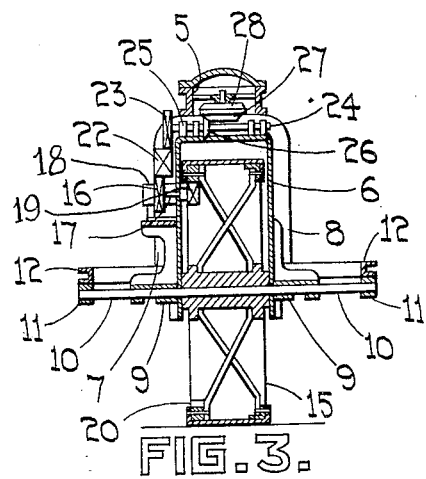
FIG.3.
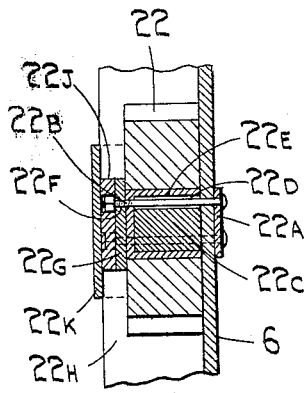
FIG.5.
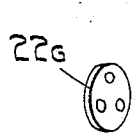 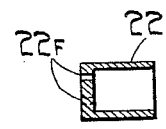 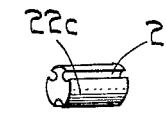 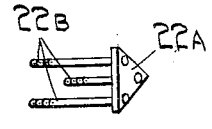
FIG.6.   FIG.7.   FIG.8.   FIG.9.
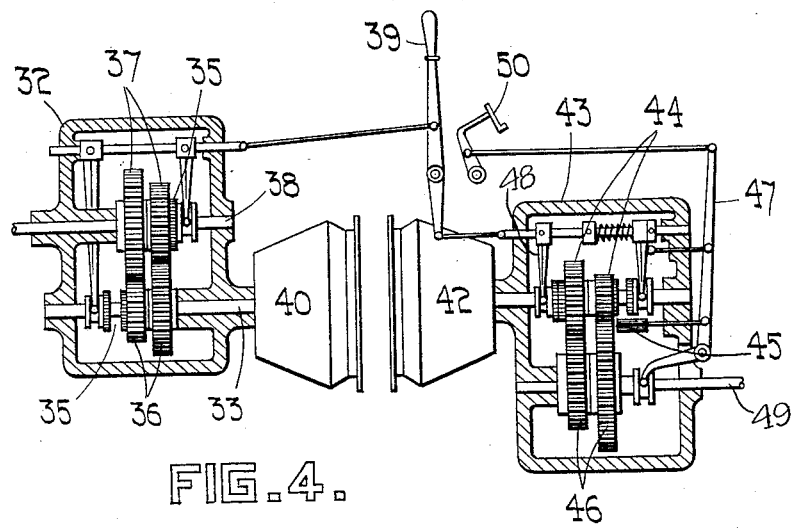
FIG.4.
INVENTOR
JOHN DONALDSON
By [signature] ATTY.

Patented June 6, 1933

1,912,518

UNITED STATES PATENT OFFICE

JOHN DONALDSON, OF GIMMERBURN, NEW ZEALAND

TRACTOR

Application filed January 21, 1931. Serial No. 510,113.

This invention relates to tractors of the oil driven type designed for all kinds of farm and stationary work.

The object of this invention is first, highest efficiency in the utilization of engine power through the influence of diameter in bull gears: secondly, greater uniformity of adhesion in the various kinds of soil by the wheels of the tractor through the elimination of the fluctuation of weight on the rear axle: thirdly, the maximum amount of traction to be secured from the load through the disposition of the draw bar and the agency of high wheels: fourthly, a tractor comfortable and easy to operate through having a steering wheel. The outstanding feature of the invention is the disposition of the power transmitting unit to the rear of the rear wheels delivering weight to the front axle where necessary, and decreasing where not necessary a preventative to front wheel side skidding on undulating land.

The tractor has a three wheel drive and is provided with fore and aft gear boxes, the former containing selectors for the front wheel drive and the latter containing a reverse gear and selectors for the rear wheels. The drive forward made very adaptable to chain and sprocket drive to the front wheel in lieu of the spur gear train as shown.

Further novel features have been introduced in respect to the driving means for the front wheel and independent clutch control and other features and constructional details which will be more fully referred to with reference to the accompanying drawings, in which:—

Figure 3 is a sectional elevation showing the front wheel, frame, driving gear train and chain tread for steering gear, the parts to the rear of the front wheel being omitted.

Figure 4 is an enlarged sectional elevation through the centre of the front and rear gear box with parts omitted.

Figure 5 is a detailed sectional view of the idler gear bearing.

Figures 6, 7, 8 and 9 are details of the parts, shown assembled in Figure 5.

Figure 1:
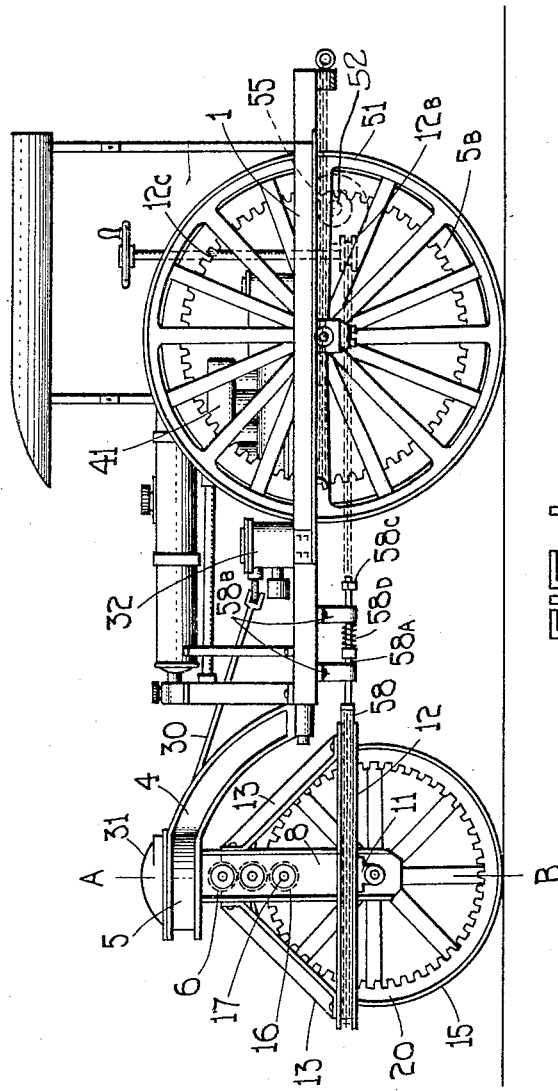
Figure 1 is a side elevation of the tractor.
Figure 2:
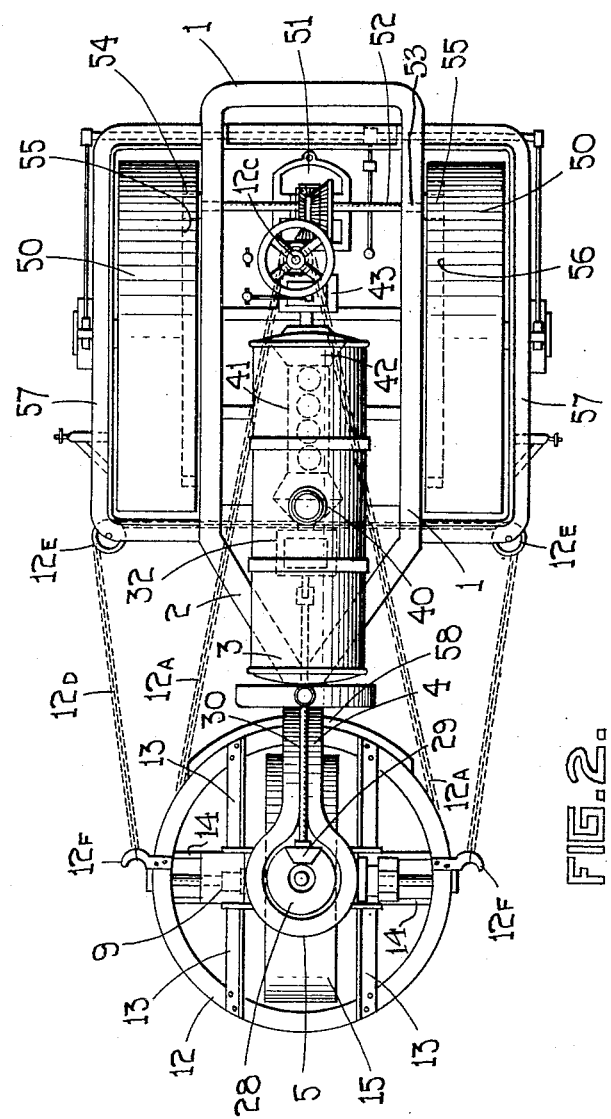
Figure 2 is a plan of Figure 1.

The chassis consists of a metal frame 1 preferably of channel bar pattern, and of the shape in plan as indicated in Figure 2, having the longitudinal channels extending parallel, the forward end 2 thereof converging to a junction at the point 3, to be rigidly connected together and to an upwardly curved metal frame 4, the upper end of which is fashioned in circular form as at 5, Figures 1 and 2, which is supported by a metal channel frame 6, having its side members 7 and 8 produced downwards, forming an inverted U shaped frame: the lower end of said frame carries the bearings 9 for the front wheel axle 10, which is produced laterally through the said bearings 9 to engage bearings 11 attached to the chain tread ring 12, formed preferably of metal channel section, the said chain tread 12 is supported by longitudinal stays 13 secured at their top ends to the side members 7 and 8 of the frame 6, and at their bottom ends to the said ring 12.

There is a wheel 15 mounted on the said axle 10 and rotatable thereon, motion being transmitted to the said wheel through a chain of gears consisting of a toothed wheel 16 mounted on a spindle 17 which is produced horizontally through suitable bearings 18, and projects therethrough on the end of which the pinion 19 is keyed: the said pinion being adapted to engage with the internal gear 20 secured to the wheel 15.

There is a pinion 22 adapted to mesh with the tooth wheel 16, the said pinion being mounted upon a stub axle, and forming an idler mounted on a suitable bearing secured to the metal channel frame 6, more clearly illustrated in detail, Figures 5 etc., which will be referred to and described in detail below.

There is another pinion 23 adapted to mesh with the said idler 22, said pinion 23 being keyed to a horizontal spindle 24 mounted upon bearings 25 secured to the top member of the metal channel frame 6; said horizontal spindle 25 also carries a bevel pinion 26, which meshes with a crown bevel wheel 27. The crown wheel is preferably a double one, the lower set of teeth 27, engaging with the said pinion 26, while the upper teeth 28 engage with the crown bevel pinion 29, which is attached to the upper end of the cardon shaft 30. Said crown bevel wheel and crown bevel pinion are housed in the circular formed top 5 of the upwardly curved metal frame 4, the said housing being provided with a cap 31 to render it dust-proof, as in the housing provision is made for carrying oil or grease to lubricate the whole of the moving parts and bearings associated with the front wheel drive.

Referring again to the idler gear 22 which is illustrated in Figure 5 and details thereof in Figures 6, 7, 8 and 9, there is a plate washer 22A to which three bolts 22B are attached, and a distance piece 22C having grooves 22D in the periphery thereof to correspond with the bolts 22B, the distance piece 22C is housed within a journal sleeve 22E having holes 22F drilled in the covered end of the said sleeve to correspond with the grooves 22D in the distance piece and the bolts 22B. An outside washer 22G is provided to form the outside shoulder to the journal sleeve and forming a face for the outside face of the idler gear 22 while the inner surface of the web of the channel 6 forms the inside face of the said idler gear 22. All the parts assembled appear as indicated in Figure 5. A nut locking washer 22J is provided to lock the nuts on the bolts 22B and a casing plate 22K attached to the flanges of the channel 6 secures the nut locking washer 22J in position to prevent the nuts on the bolts 22B from slackening.

The transmission for the front wheel drive is through the medium of a gear box 32, disposed in front of the engine, more clearly shown in detail in Figure 4, where a two speed forward gear is shown, the main shaft 33 being the lower one. The lay shaft carrying the gears 37, is disposed at the top of the box as indicated at 38. The gears 36 on the main shaft 33 are in constant mesh with the gears 37 on the shaft 38, one of said gears 37 and one of the gears 36 being keyed to their respective shafts while the other gears are free thereon, but are capable of being secured to their shafts by means of clutches 35 operable under the control of a gear selector lever 39. The main shaft is produced to accommodate a clutch 40 and for positive engagement with the primary shaft from the engine 41. The engine or motor 41 is supported by and between the longitudinally extending channel bars of the frame 1.

The primary shaft from the engine 41 projects rearwards through a rear clutch 42 to the main rear wheel transmission shaft, which is through gear box 43, more clearly illustrated in Figure 4, wherein a two speed forward gear is indicated at 44, and a one speed reverse gear indicated at 45, the lay shaft in this instance being the lower one. The corresponding gears to 44 and 45 are indicated at 46.

Gear speed selection is effected by means of clutches 48 operated by the selector lever 39, while the selection and adjustment of the reverse gear 45 is controlled by means of a pivoted lever 47 connected to a suitable foot or hand lever 50.

The main transmission shaft 49 for the rear wheels 50′ is produced rearwards from the gear box 43 to the differential gears 51. The motion is transmitted therethrough to a rear axle 52 which is suitably supported in bearings 53, secured to channel framing 1. The rear axle is produced at both ends beyond the said bearings to carry pinions 54 and 55, which are adapted to mesh with internal gears 56 attached to the rear wheels transmitting a direct drive thereto.

There are substantial metal frame guards 57 produced laterally from the main channel frame 1, which cross the outside face of the rear wheels horizontally to form the guard thereto.

Describing now the method of steering. The combination of parts comprises the chain tread 12 which is supported by longitudinal stays 13, and lateral stays 14, the upper ends of the said stays being secured to the metal channel frame 12, and a steering chain 12A. This chain is attached to the chain tread 12, and produced to a steering control, disposed at the rear of the engine 41, and the ends of the said chain 12A are attached to a spirally grooved drum 12B mounted at the lower end of the steering column 12C which is suitably fixed to the channel frame 1. In addition to the said steering chain 12A there is a steadying chain 12D which is reeved through a pulley block 12E on each side of the lateral projecting frames 57 and the ends are attached to the chain tread 12 as indicated at 12F. It is preferable to have a buffer at the rear of the front wheel 15 to relieve any sudden undue strain thereon. Suitable shock absorbing mechanism constructed for this purpose is indicated in Figure 1, and consists of a segment 58 in contact with the steering chain path tread 12, the said segment having a spindle 58A projecting rearwards which is supported by bearings 58B and means 58C at the rear end whereby the tension on the buffer spring 58D may be adjusted.

What I claim as new and desire to secure by Letters Patent is :—

1. A tractor including a metal channel frame made up of longitudinally extending channel bars having their forward ends converging to a juncture in the center line of the frame, a wheel frame arranged laterally of each channel bar, rear wheels supported by the wheel frames and the longitudinally extending channel bars of the channel frame, a forward carriage frame including a circular frame and an inverted U-shaped channel bar connected to the circular frame and to the terminal of the converging forward ends of the channel bars of the channel frame, said circular frame being formed with a steering chain tread channel, a front wheel carried by said forward carriage frame, a steering chain in said steering chain tread channel, a shock absorbing mechanism including a segment in contact with the said steering chain tread, a spindle projecting rearwardly therefrom and an adjustable spring mounted on said spindle, a power motor, driving mechanism for the front wheel, and a connection between the power motor and said driving mechanism.

2. A tractor including a channel frame comprising longitudinally extending channel bars, their forward ends being converging and upturned to a juncture in the center line of the frame, wheel frames arranged beyond said bars, wheels within the wheel frames, a forward wheel frame mounted at the forward ends of the longitudinally extending bars of the channel frame, said forward wheel frame including parallel channel bars having a fixed connection at the forward ends of the longitudinally extending bars, a circular frame connected to said forward wheel frame, said circular frame having a steering chain tread channel, a front wheel carried by said forward wheel frame, a steering chain operating in said channel to steer said forward wheel, shock absorbing means engaging the steering chain tread, a power motor supported by and between the longitudinally extending channel bars, driving means for the front wheel to be operated by the motor, and transmission mechanism forming part of said driving means.

In witness whereof I have hereunto affixed my signature this 19th day of September, 1930.

JOHN DONALDSON.